(12) United States Patent
Green

(10) Patent No.: US 9,252,426 B2
(45) Date of Patent: Feb. 2, 2016

(54) SILICON ANODE FOR A RECHARGEABLE BATTERY

(75) Inventor: Mino Green, London (GB)

(73) Assignee: Nexeon Limited, Oxfordshire (GB)

( * ) Notice: Subject to any disclaimer, the term of this patent is extended or adjusted under 35 U.S.C. 154(b) by 536 days.

(21) Appl. No.: 12/599,034

(22) PCT Filed: May 9, 2008

(86) PCT No.: PCT/GB2008/001604
§ 371 (c)(1),
(2), (4) Date: Feb. 26, 2010

(87) PCT Pub. No.: WO2008/139157
PCT Pub. Date: Nov. 20, 2008

(65) Prior Publication Data
US 2010/0190061 A1    Jul. 29, 2010

(30) Foreign Application Priority Data

May 11, 2007    (GB) .................................. 0709165.5

(51) Int. Cl.
| | | |
|---|---|---|
| *H01M 4/58* | (2010.01) | |
| *H01M 4/88* | (2006.01) | |
| *H01M 4/38* | (2006.01) | |
| H01M 4/134 | (2010.01) | |
| H01M 4/1395 | (2010.01) | |
| H01M 4/525 | (2010.01) | |
| H01M 10/052 | (2010.01) | |

(52) U.S. Cl.
CPC ................ *H01M 4/38* (2013.01); *H01M 4/134* (2013.01); *H01M 4/1395* (2013.01); *H01M 4/525* (2013.01); *H01M 10/052* (2013.01); *Y02E 60/122* (2013.01)

(58) Field of Classification Search
USPC ...................................................... 429/231.95
See application file for complete search history.

(56) References Cited

U.S. PATENT DOCUMENTS

| | | |
|---|---|---|
| 3,351,445 A | 11/1967 | Fielder et al. |
| 4,002,541 A | 1/1977 | Streander |
| 4,436,796 A | 3/1984 | Huggins et al. |
| 4,950,566 A | 8/1990 | Huggins et al. |
| 5,260,148 A | 11/1993 | Idota |

(Continued)

FOREIGN PATENT DOCUMENTS

| | | |
|---|---|---|
| CN | 1447916 A | 10/2003 |
| CN | 101442124 A | 5/2009 |

(Continued)

OTHER PUBLICATIONS

Chan et al., "Surface Chemistry and Morphology of the Solid Electrolyte Interphase on Silicon Nanowire Lithium-Ion Battery Anodes", Journal of Power Sources, 189(2), 1132-1140, (2009).

(Continued)

*Primary Examiner* — Ula C Ruddock
*Assistant Examiner* — Osei Amponsah
(74) *Attorney, Agent, or Firm* — McDonnell Boehnen Hulbert & Berghoff LLP

(57) ABSTRACT

An electrode and electrode assembly, for example for use as an anode in a lithium-ion rechargeable cell that uses silicon or silicon-based elements of specific dimensions and geometry as its active material, is provided, as well as methods for manufacturing the same. The active silicon or silicon-based material may include fibers, sheets, flakes, tubes or ribbons, for example.

22 Claims, 1 Drawing Sheet

(56) References Cited

U.S. PATENT DOCUMENTS

| | | |
|---|---|---|
| 5,262,021 A | 11/1993 | Lehmann et al. |
| 5,660,948 A | 8/1997 | Barker |
| 5,907,899 A | 6/1999 | Dahn et al. |
| 5,980,722 A | 11/1999 | Kuroda et al. |
| 6,022,640 A | 2/2000 | Takada et al. |
| 6,042,969 A | 3/2000 | Yamada et al. |
| 6,063,995 A | 5/2000 | Bohland et al. |
| 6,235,427 B1* | 5/2001 | Idota et al. .................. 429/218.1 |
| 6,296,969 B1 | 10/2001 | Yano et al. |
| 6,334,939 B1 | 1/2002 | Zhou et al. |
| 6,337,156 B1 | 1/2002 | Narang et al. |
| 6,353,317 B1 | 3/2002 | Green et al. |
| 6,399,177 B1 | 6/2002 | Fonash et al. |
| 6,399,246 B1 | 6/2002 | Vandayburg et al. |
| 6,432,579 B1* | 8/2002 | Tsuji et al. .................. 429/218.1 |
| 6,589,696 B2 | 7/2003 | Matsubara et al. |
| 6,605,386 B1 | 8/2003 | Kasamatsu et al. |
| 6,620,547 B1 | 9/2003 | Sung et al. |
| 6,887,511 B1 | 5/2005 | Shima et al. |
| 6,916,679 B2 | 7/2005 | Snyder et al. |
| 7,033,936 B1 | 4/2006 | Green |
| 7,051,945 B2 | 5/2006 | Empedocles et al. |
| 7,070,632 B1 | 7/2006 | Visco et al. |
| 7,094,499 B1 | 8/2006 | Hung |
| 7,147,894 B2 | 12/2006 | Zhou et al. |
| 7,192,673 B1 | 3/2007 | Ikeda et al. |
| 7,311,999 B2 | 12/2007 | Kawase et al. |
| 7,318,982 B2 | 1/2008 | Gozdz et al. |
| 7,348,102 B2 | 3/2008 | Li et al. |
| 7,358,011 B2 | 4/2008 | Fukuoka et al. |
| 7,378,041 B2 | 5/2008 | Asao et al. |
| 7,425,285 B2 | 9/2008 | Asao et al. |
| 7,476,469 B2 | 1/2009 | Ota et al. |
| 7,569,202 B2 | 8/2009 | Farrell et al. |
| 7,659,034 B2 | 2/2010 | Minami et al. |
| 7,674,552 B2 | 3/2010 | Nakai et al. |
| 7,767,346 B2 | 8/2010 | Kim et al. |
| 7,862,933 B2 | 1/2011 | Okumura et al. |
| 8,034,485 B2 | 10/2011 | Dahn et al. |
| 2001/0023986 A1 | 9/2001 | Mancevski |
| 2002/0074972 A1* | 6/2002 | Narang et al. .................. 320/131 |
| 2002/0121460 A1* | 9/2002 | Moy et al. ...................... 208/133 |
| 2003/0135989 A1 | 7/2003 | Huggins et al. |
| 2004/0072067 A1 | 4/2004 | Minami et al. |
| 2004/0126659 A1* | 7/2004 | Graetz et al. ................ 429/218.1 |
| 2004/0151987 A1 | 8/2004 | Kawase et al. |
| 2004/0166319 A1 | 8/2004 | Li et al. |
| 2004/0185346 A1 | 9/2004 | Takeuchi et al. |
| 2004/0197660 A1 | 10/2004 | Sheem et al. |
| 2004/0214085 A1 | 10/2004 | Sheem et al. |
| 2004/0224231 A1 | 11/2004 | Fujimoto et al. |
| 2004/0241548 A1 | 12/2004 | Nakamoto et al. |
| 2005/0042515 A1 | 2/2005 | Hwang et al. |
| 2005/0079414 A1 | 4/2005 | Yamamoto et al. |
| 2005/0079420 A1 | 4/2005 | Cho et al. |
| 2005/0118503 A1 | 6/2005 | Honda et al. |
| 2005/0191550 A1 | 9/2005 | Satoh et al. |
| 2005/0193800 A1 | 9/2005 | DeBoer et al. |
| 2005/0214644 A1 | 9/2005 | Aramata et al. |
| 2006/0003226 A1 | 1/2006 | Sawa et al. |
| 2006/0004226 A1 | 1/2006 | Machhammer et al. |
| 2006/0019115 A1 | 1/2006 | Wang et al. |
| 2006/0019168 A1 | 1/2006 | Li et al. |
| 2006/0024582 A1 | 2/2006 | Li et al. |
| 2006/0051670 A1 | 3/2006 | Aramata et al. |
| 2006/0057463 A1 | 3/2006 | Gao et al. |
| 2006/0088767 A1 | 4/2006 | Li et al. |
| 2006/0097691 A1* | 5/2006 | Green .......................... 320/107 |
| 2006/0134516 A1 | 6/2006 | Im et al. |
| 2006/0134518 A1 | 6/2006 | Kogetsu et al. |
| 2006/0147800 A1 | 7/2006 | Sato et al. |
| 2006/0154071 A1 | 7/2006 | Homma et al. |
| 2006/0166093 A1 | 7/2006 | Zaghib et al. |
| 2006/0175704 A1 | 8/2006 | Shimizu et al. |
| 2006/0257307 A1 | 11/2006 | Yang |
| 2006/0263687 A1 | 11/2006 | Leitner et al. |
| 2006/0275663 A1 | 12/2006 | Matsuno et al. |
| 2006/0275668 A1 | 12/2006 | Peres et al. |
| 2006/0286448 A1 | 12/2006 | Snyder et al. |
| 2007/0020521 A1* | 1/2007 | Obrovac et al. ............. 429/218.1 |
| 2007/0026313 A1 | 2/2007 | Sano |
| 2007/0031733 A1 | 2/2007 | Kogetsu et al. |
| 2007/0037063 A1 | 2/2007 | Choi et al. |
| 2007/0048609 A1 | 3/2007 | Yeda et al. |
| 2007/0059598 A1 | 3/2007 | Yang |
| 2007/0065720 A1 | 3/2007 | Hasewaga et al. |
| 2007/0072074 A1 | 3/2007 | Yamamoto et al. |
| 2007/0087268 A1 | 4/2007 | Kim et al. |
| 2007/0099084 A1 | 5/2007 | Huang et al. |
| 2007/0099085 A1 | 5/2007 | Choi et al. |
| 2007/0105017 A1 | 5/2007 | Kawase et al. |
| 2007/0117018 A1 | 5/2007 | Huggins |
| 2007/0122702 A1 | 5/2007 | Sung et al. |
| 2007/0148544 A1 | 6/2007 | Le |
| 2007/0172732 A1 | 7/2007 | Jung et al. |
| 2007/0184345 A1 | 8/2007 | Neudecker et al. |
| 2007/0190413 A1 | 8/2007 | Lee et al. |
| 2007/0202395 A1 | 8/2007 | Snyder et al. |
| 2007/0202402 A1 | 8/2007 | Asahina et al. |
| 2007/0207080 A1 | 9/2007 | Yang |
| 2007/0207385 A1 | 9/2007 | Liu et al. |
| 2007/0209584 A1 | 9/2007 | Kalynushkin et al. |
| 2007/0212538 A1 | 9/2007 | Niu |
| 2007/0218366 A1 | 9/2007 | Kalynushkin et al. |
| 2007/0224508 A1 | 9/2007 | Aramata et al. |
| 2007/0224513 A1 | 9/2007 | Kalynushkin et al. |
| 2007/0238021 A1 | 10/2007 | Liu et al. |
| 2007/0243469 A1 | 10/2007 | Kim et al. |
| 2007/0264564 A1 | 11/2007 | Johnson et al. |
| 2007/0264574 A1 | 11/2007 | Kim et al. |
| 2007/0269718 A1 | 11/2007 | Krause et al. |
| 2007/0277370 A1 | 12/2007 | Kalynushkin et al. |
| 2008/0003496 A1 | 1/2008 | Neudecker et al. |
| 2008/0003503 A1 | 1/2008 | Kawakami et al. |
| 2008/0020281 A1 | 1/2008 | Kogetsu et al. |
| 2008/0038638 A1 | 2/2008 | Zhang et al. |
| 2008/0044732 A1* | 2/2008 | Salot et al. .................... 429/322 |
| 2008/0090149 A1 | 4/2008 | Sano et al. |
| 2008/0096110 A1 | 4/2008 | Bito et al. |
| 2008/0107967 A1 | 5/2008 | Liu et al. |
| 2008/0113271 A1 | 5/2008 | Ueda et al. |
| 2008/0118834 A1 | 5/2008 | Yew et al. |
| 2008/0124631 A1 | 5/2008 | Fukui et al. |
| 2008/0131782 A1 | 6/2008 | Hagiwara et al. |
| 2008/0138710 A1 | 6/2008 | Liaw et al. |
| 2008/0138716 A1 | 6/2008 | Iwama et al. |
| 2008/0145752 A1 | 6/2008 | Hirose et al. |
| 2008/0145759 A1 | 6/2008 | Sung et al. |
| 2008/0160415 A1 | 7/2008 | Wakita et al. |
| 2008/0176139 A1 | 7/2008 | White et al. |
| 2008/0206631 A1 | 8/2008 | Christensen et al. |
| 2008/0206641 A1 | 8/2008 | Christensen et al. |
| 2008/0233479 A1 | 9/2008 | Sung et al. |
| 2008/0233480 A1 | 9/2008 | Sung et al. |
| 2008/0241647 A1 | 10/2008 | Fukui et al. |
| 2008/0241703 A1 | 10/2008 | Yamamoto et al. |
| 2008/0248250 A1 | 10/2008 | Flemming et al. |
| 2008/0261112 A1 | 10/2008 | Nagata et al. |
| 2008/0305391 A1 | 12/2008 | Hirose et al. |
| 2009/0053589 A1 | 2/2009 | Obrovac et al. |
| 2009/0078982 A1 | 3/2009 | Rachmady et al. |
| 2009/0087731 A1 | 4/2009 | Fukui et al. |
| 2009/0101865 A1 | 4/2009 | Matsubara et al. |
| 2009/0117466 A1 | 5/2009 | Zhamu et al. |
| 2009/0186267 A1 | 7/2009 | Tiegs |
| 2009/0239151 A1 | 9/2009 | Nakanishi et al. |
| 2009/0253033 A1 | 10/2009 | Hirose et al. |
| 2009/0269677 A1 | 10/2009 | Hirose et al. |
| 2009/0305129 A1 | 12/2009 | Fukui et al. |
| 2010/0085685 A1 | 4/2010 | Pinwill |
| 2010/0092868 A1 | 4/2010 | Kim et al. |
| 2010/0124707 A1 | 5/2010 | Hirose et al. |
| 2010/0136437 A1 | 6/2010 | Nishida et al. |
| 2010/0151324 A1* | 6/2010 | Green et al. .................... 429/220 |

(56) References Cited

U.S. PATENT DOCUMENTS

| | | |
|---|---|---|
| 2010/0285358 A1 | 11/2010 | Cui et al. |
| 2010/0297502 A1 | 11/2010 | Zhu et al. |
| 2010/0330419 A1 | 12/2010 | Cui et al. |

FOREIGN PATENT DOCUMENTS

| | | | | |
|---|---|---|---|---|
| DE | 199 22 257 A1 | 11/2000 | | |
| DE | 103 47 570 A1 | 5/2005 | | |
| EP | 0 281 115 | 9/1988 | | |
| EP | 0 553 465 A1 | 8/1993 | | |
| EP | 0 553 465 A1 | 8/1993 | | |
| EP | 0 820 110 A2 | 1/1998 | | |
| EP | 1 011 160 A1 | 6/2000 | | |
| EP | 0 936 687 B1 | 12/2001 | | |
| EP | 1 231 653 A1 | 8/2002 | | |
| EP | 1 231 654 A1 | 8/2002 | | |
| EP | 1 258 937 A1 | 11/2002 | | |
| EP | 1 083 614 B1 | 5/2003 | | |
| EP | 1 313 158 A2 | 5/2003 | | |
| EP | 1 335 438 A1 | 8/2003 | | |
| EP | 1 289 045 B1 | 3/2006 | | |
| EP | 1 657 769 A1 | 5/2006 | | |
| EP | 1 850 409 A1 | 10/2007 | | |
| EP | 1 771 899 B1 | 2/2008 | | |
| EP | 1 657 768 B1 | 5/2008 | | |
| EP | 2 058 882 | 5/2009 | | |
| EP | 2 204 868 A3 | 7/2010 | | |
| FR | 2 885 913 B1 | 8/2007 | | |
| GB | 980513 | 1/1965 | | |
| GB | 1 014 706 | 12/1965 | | |
| GB | 2 395 059 A | 5/2004 | | |
| GB | 2 464 157 B | 1/2010 | | |
| GB | 2 464 158 | 4/2010 | | |
| JP | 02-209492 A | 8/1990 | | |
| JP | 6-283156 | 10/1994 | | |
| JP | 10-046366 | 2/1998 | | |
| JP | 10-83817 | 3/1998 | | |
| JP | 10-199524 | 7/1998 | | |
| JP | 10-199524 A | 7/1998 | | |
| JP | 2000-3727 | 1/2000 | | |
| JP | 2000-173594 | 6/2000 | | |
| JP | 2000-348730 A | 12/2000 | | |
| JP | 2001-291514 | 10/2001 | | |
| JP | 2002-279974 A | 9/2002 | | |
| JP | 2002260637 | 9/2002 | | |
| JP | 2002-313319 A | 10/2002 | | |
| JP | 2002-313345 A | 10/2002 | | |
| JP | 2002313319 | * 10/2002 | ............ | H01M 4/02 |
| JP | 2003313319 | * 10/2002 | ............ | H01M 4/02 |
| JP | 2003-017040 | 1/2003 | | |
| JP | 2003-168426 | 6/2003 | | |
| JP | 2003168426 | 6/2003 | | |
| JP | 2003522367 | 7/2003 | | |
| JP | 04-607488 | 2/2004 | | |
| JP | 2004-71305 | 3/2004 | | |
| JP | 2004-095264 | 3/2004 | | |
| JP | 2004-214054 | 7/2004 | | |
| JP | 2004-281317 | 10/2004 | | |
| JP | 2004-296386 A | 10/2004 | | |
| JP | 2004-533699 A | 11/2004 | | |
| JP | 2004-533699 A | 11/2004 | | |
| JP | 2005-310759 A | 11/2005 | | |
| JP | 2006-505901 A | 2/2006 | | |
| JP | 2006-276214 A | 10/2006 | | |
| JP | 2006-290938 A | 10/2006 | | |
| JP | 2006-335410 A | 12/2006 | | |
| JP | 2007-165079 A | 6/2007 | | |
| JP | 2008-034266 | 2/2008 | | |
| JP | 2008-186732 | 8/2008 | | |
| JP | 2008-234988 | 10/2008 | | |
| JP | 2009-252348 A | 10/2009 | | |
| KR | 2007-023141 | 2/2007 | | |
| KR | 2007-0110569 A | 11/2007 | | |
| KR | 2008-038806 A | 5/2008 | | |
| NL | 1015956 | 8/2000 | | |
| SU | 471402 | 5/1975 | | |
| SU | 544019 | 1/1977 | | |
| WO | WO 99/33129 | 7/1999 | | |
| WO | WO 01/13414 A1 | 2/2001 | | |
| WO | WO 01/35473 A1 | 5/2001 | | |
| WO | WO 01/96847 A1 | 12/2001 | | |
| WO | WO 01/96847 A1 | 12/2001 | | |
| WO | WO 02/25356 A2 | 3/2002 | | |
| WO | WO 02/47185 A2 | 6/2002 | | |
| WO | WO 03/063271 A1 | 7/2003 | | |
| WO | WO 03/075372 A2 | 9/2003 | | |
| WO | WO 2004/042851 A2 | 5/2004 | | |
| WO | WO 2004/052489 A2 | 6/2004 | | |
| WO | WO 2004/083490 A2 | 9/2004 | | |
| WO | WO 2005/011030 A1 | 2/2005 | | |
| WO | WO 2005/113467 A1 | 12/2005 | | |
| WO | WO 2005/119753 A2 | 12/2005 | | |
| WO | WO 2006/067891 A1 | 6/2006 | | |
| WO | WO 2006/073427 A2 | 7/2006 | | |
| WO | WO 2006/120332 A2 | 11/2006 | | |
| WO | WO 2007/044315 A1 | 4/2007 | | |
| WO | WO 2007/083152 | 7/2007 | | |
| WO | WO 2007/083155 | 7/2007 | | |
| WO | WO 2007/083155 A1 | 7/2007 | | |
| WO | WO 2007083155 | * 7/2007 | ............ | H01M 4/38 |
| WO | WO 2007/114168 A1 | 10/2007 | | |
| WO | WO 2007/136164 A1 | 11/2007 | | |
| WO | WO 2008/029888 A1 | 3/2008 | | |
| WO | WO 2008/044683 A1 | 4/2008 | | |
| WO | WO 2008/072460 A1 | 6/2008 | | |
| WO | WO 2008/097723 A1 | 8/2008 | | |
| WO | WO 2008/139157 A1 | 11/2008 | | |
| WO | WO 2009/010757 | 1/2009 | | |
| WO | WO 2009/010758 | 1/2009 | | |
| WO | WO 2009/010759 | 1/2009 | | |
| WO | WO 2009/026466 | 2/2009 | | |
| WO | WO 2009/120404 A1 | 10/2009 | | |
| WO | WO 2009/128800 | 10/2009 | | |
| WO | WO 2010/040985 | 4/2010 | | |
| WO | WO 2010/040986 | 4/2010 | | |
| WO | WO 2010/060348 A1 | 6/2010 | | |
| WO | WO 2010/130975 A1 | 11/2010 | | |
| WO | WO 2010/130976 A1 | 11/2010 | | |

OTHER PUBLICATIONS

Chen et al., Binder Effect on Cycling Performance of Silicon/Carbon Composite Anodes for Lithium Ion Batteries, 36 (2006) 1099-1104.

Chen et al., "Effect of Vinylene Carbonate (VC) as Electrolyte Additive on Electrochemical Performance of Si Film Anode for Lithium Ion Batteries", Journal of Power Sources, 174(2), 538-543, (2007).

Chevrier et al., "Methods for Successful Cycling of Alloy Negative Electrodes in Li-Ion Cells", 220$^{th}$ ECS Meeting, Abstract #1237 (2011).

Choi et al., "Effect of Fluoroethylene Carbonate Additive on Interfacial Properties of Silicon Thin-Film Electrode", Journal of Power Sources, 161(2), 1254-1259 (2006).

El Ouatani et al., "The Effect of Vinylene Carbonate Additive on Surface Film Formation on Both Electrodes in Li-Ion Batteries", J. Electrochem. Soc., 156(2), A103-A113 (2009).

Han et al., "Neutralized Poly (Acrylic Acid) as Polymer Binder for High Capacity Silicon Negative Electrodes", 220$^{th}$ ECS Meeting, Abstract #1250 (2011).

Heinze et al., "Viscosity Behaviour of Multivalent Metal Ion-Containing Carboxymethyl Cellulose Solutions", Die Angewandte Makromolekulare Chamie 220, 123-132, (Nr. 3848), (1994).

Hochgatterer et al., "Silicon/Graphite Composite Electrodes for High Capacity Anodes: Influence of Binder Chemistry on Cycling Stability", Electrochemical and Solid-State Letters, 11 (5) (2008) A76-A80.

Komba et al., "Functional Interface of Polymer Modified Graphite Anode", Journal of Power Sources, 189, (2009), 197-203.

Komba et al., "Polyacrylate as Functional Binder for Silicon and Grapite Composite Electrode in Lithium-Ion Batteries", Electrochemistry, 79(1), (2011), 6-9.

(56) References Cited

OTHER PUBLICATIONS

Komba et al., "Polyacrylate Modifier for Graphite Anode of Lithium-Ion Batteries", Electrochemical and Solid-State Letters, 12(5), (2009), A107-A110.

Komba et al., "Study on Polymer Binders for High-Capacity SiO Negative Electrode of Li-Ion Batteries", Journal of Physical Chemistry, 115, (2011), 13487-13495.

Lee et al., "Effect of Poly (Acrylic Acid) on Adhesion Strength and Electrochemical Performance of Natural Graphite Negative Electrode for Lithium-Ion Batteries", Journal of Power Sources, 161(1) (2006), 612-616.

Li et al., "Sodium Carboxymethyl Cellulose: A Potential Binder for Si Negative Electrodes for Li-Ion Batteries", Electrochemical and Solid-State Letters, 10(2) (2007), A17-A20.

Liu et al., "Enhanced Cycle Life of Si Anode for Li-Ion Batteries by Using Modified Elastomeric Binder", Electrochemical and Solid-State Letters, 8(2) (2005), A108-A103.

Obrovac et al., "Structural Changes in Silicon Anodes During Lithium Insertion/Extraction", Electrochemical and Solid-State Letters, 7(5), (2004), A96-A96.

Sugama, et al., "Nature of Interfacial Interaction Mechanisms Between Polyacrylic Acid Macromolecules and Oxide Metal Surfaces", Journal of Materials Science, 19 (1984) 4045-4056.

Ui et al., "Improvement of Electrochemical Characteristics of Natural Graphite Negative Electrode Coated With Polyacrylic Acid in Pure Propylene Carbonate Electrolyte", Journal of Power Sources, 173(1), (2007), 518-521.

Wen et al., "Chemical Diffusion in Intermediate Phases in the Lithium—Silicon System", Journal of Solid State Chemistry, 37 (1981) 271-278.

Weydanz et al., "A Room Temperature Study of the Binary Lithium—Silicon and the Ternary Lithium—Chromium—Silicon System for use in Rechargeable Lithium Batteries", Journal of Power Sources, 81-82 (1999) 237-242.

Yabuuchi et al., "Graphite-Silicon-Polyacrylate Negative Electrodes inIonic Liquid Electrolyte for Safer Rechargeable Li-Ion Batteries", Advanced Energy Materials, 1, (2011), 759-765.

Zhang et al., "A Review on Electrolyte Additives for Lithium-Ion Batteries", Journal of Power Sources, 162(2), 1379-1394, (2006).

Key to Metal Aluminum—Silicon Alloys, www.keytometals.com/Article80.

Peng et al., "Uniform, Axial-Orientation Alignment of One-Dimensional Single-Crystal Silicon Nanostructure Arrays", Angew. Chem. Ind. Ed., 44 (2005) 2737-2742.

Peng et al., "Simultaneous Gold Deposition and Formation of Silicon Nanowire Arrays", Journal of Electroanalytical Chemistry, 558 (2003) 35-39.

Canham, L. T., "Diffusion of Li IN Si", Properties of Silicon, EMIS Datareviews Series No. 4 (1987) 454-462.

Qiu et al., "Self-Assembled Growth and Optical Emission of Silver-Capped Silicon Nanowires", Applied Physics Letters, vol. 84, No. 19, (2004) 3867-3869.

Kim et al., "(110) Silicon Etching for High Aspect Ratio Comb Structures", 1997 6th International Conference on Emerging Technologies and Factory Automation Proceedings, (1997) 248-252.

Sharma et al., "Thermodynamic Properties of the Lithium—Silicon System", J. Electrochem. Soc.: Electrochemical Science and Technology, vol. 123 (1976) 1763-1768.

Qiu et al., "From S1 Nanotubes to Nanowires: Synthesis, Characterization, and Self-Assembly", Journal of Crystal Growth, 277 (2005) 143-148.

Tokoro et al., "Anisotropic Etching Properties of Silicon in KOH and TMAH Solutions", Proceedings of the 1998 International Symposium on Micromechatronics and Human Science (1998) 65-70.

Tsuchiya et al., "Structural Fabrication Using Cesium Chloride Island Arrays as a Resist in a Fluorocarbon Reactive Ion Etching Plasma", Electrochemical and Solid-State Letters, 3 (1) (2000) 44-46.

Wagner et al., "Vapor-Liquid-Solid Mechanism of Single Crystal Growth", Applied Physics Letters, vol. 4, No. 5 (1964) 89-90.

Lang, Walter, "Silicon Microstructuring Technology", Materials Science and Engineering, R17 (1996) 1-55.

Liu et al., "Effect of Electrode Structure on Performance of Si Anode in Li-Ion Batteries: Si Particle Size and Conductive Additive", Journal of Power Source, 140 (2005) 139-144.

Yan et al., "$H_2$-Assisted Control Growth of Si Nanowires", Journal of Crystal Growth, 257 (2003) 69-74.

Liu et al., "A Novel Method of Fabricating Porous Silicon Material: Ultrasonically Enhanced Anodic Electrochemical Etching", Solid State Communications, 127 (2003) 583-588.

Zhang et al., "Bulk-Quantity Si Nanowires Synthesized by SiO Sublimation", Journal of Crystal Growth, 212 (2000) 115-118.

Wong et al., "Controlled Growth of Silicon Nanowires Synthesized via Solid-Liquid-Solid Mechanism", Science and Technology of Advanced Materials, 6 (2005) 330-334.

Zhang et al., "Synthesis of Thin Si Whiskers (Nanowires) Using $SiCl_4$", Journal of Crystal Growth, 2006 (2001) 185-191.

Yoshio et al., "Electrochemical Behaviors of Silicon Based Anode Material", Journal of Power Sources, 153 (2006) 375-379.

Zhang et al., "Catalytic Growth of x-FiSi$_2$ and Silicon Nanowires", Journal of Crystal Growth, 280 (2005) 286-291.

Colinge, Jean-Pierre, "Silicon-on-Insulator Technology: Materials to VLSI", Chapter 2, SOI Materials, (1991), Cover page and p. 38.

Deal et al., "General Relationship for the Thermal Oxidation of Silicon", Journal of Applied Physics, vol. 36, No. 12, (Dec. 1965) 3770-3778.

Feng et al., "Lithography-Free Silicon Micro-Pillars as Catalyst Supports for Microfabricated Fuel Cell Applications", Electrochemistry Communications, 8 (2006) 1235-1238.

Green et al., "Quantum Pillar Structures on n+ Gallium Arsenide Fabricated Using "Natural" Lithography", Appl. Phys. Lett., 62 (3) (1993) 264-266.

Green et al., "Structured Silicon Anodes for Lithium Battery Applications", Electrochemical and Solid-State Letters, 6 (5) (2003) A75-A79.

Green et al., "Mesoscopic Hemisphere Arrays for use as Resist in Solid State Structure Fabrication", J. Vac. Sci. Technol. B 17(5) (1999) 2074-2083.

Yan et al., "Growth of Amorphous Silicon Nanowires via a Solid-Liquid-Solid Mechanism", Chemical Physics Letters, 323 (2000) 224-228.

Shin et al., "Porous Silicon Negative Electrodes for Rechargeable Lithium Batteries", Journal of Power Sources, 139 (2005) 314-320.

Li et al., "A High Capacity Nano-Si Composite Anode Material for Lithium Rechargeable Batteries", Electrochemical and Solid-State Letters, 2 (11) (1999) 547-549.

Li et al., "The Crystal Structural Evolution of Nano-Si Anode Caused by Lithium Insertion and Extraction at Room Temperature", Solid State Ionics, 135 (2000) 181-191.

Huggins, Robert A., "Lithium Alloy Anodes" in Handbook of Battery Materials, J.O. Besenhard Ed., Wiley-VCH, Weinheim, 361-381 (1999).

Chang et al., "Ultrafast Growth of Single-Crystalline Si Nanowires", Materials Letters, 60 (2006) 2125-2128.

Kim et al., "Improvement of Silicon Powder Negative Electrodes by Copper Electroless Deposition for Lithium Secondary Batteries", Journal of Power Sources, 147 (2005) 227-233.

Jianfeng et al., "Large-Scale Array of Highly Oriented Silicon-Rich Micro/Nanowires Induced by Gas Flow Steering", Solid State Communications, 133 (2005) 271-275.

Lu et al., "A Study of the Mechanisms of Erosion in Silicon Single Crystals Using Hertzian Fracture Tests", Wear, 186-187 (1995) 105-116.

Kleimann et al., "Formation of Wide and Deep Pores in Silicon by Electrochemical Etching", Materials Science and Engineering, B69-70 (2000) 29-33.

Kolasinski, Kurt W., "Silicon Nanostructures from Electroless Electrochemical Etching", Current Opinion in Solid State and Materials Science, 9 (2005) 73-83.

Pei et al., "Silicon Nanowires Grown from Silicon Monoxide Under Hydrothermal Conditions", Journal of Crystal Growth, 289 (2006) 423-427.

(56) References Cited

OTHER PUBLICATIONS

Chen et al., "Selective Etching of Silicon in Aqueous Ammonia Solution", Sensors and Actuators, A 49 (1995) 115-121.
Maranchi et al., "Interfacial Properties of the a-Si/Cu:Active-Inactive Thin-Film Anode Systems for Lithium-Ion Batteries", Journal of the Electrochemical Society: 153 (6) (2006) A1246-A1253.
Nakahata et al., "Fabrication of Lotus-Type Porous Silicon by Unidirectional Solidification in Hyrdogen", Materials Science and Engineering A 384 (2004) 373-376.
Niparko, J.K. (Editor), "Cochlear Implant Technology", Pub., Lippincott Williams and Wilkins, Philadelphia, (2000) 108-121.
Ohara et al., "A Thin Film Silicon Anode for Li-Ion Batteries Having a Very Large Specific Capacity and Long Cycle Life", Journal of Power Sources, 136 (2004) 303-306.
Peng et al., "Dendrite-Assisted Growth of Silicon Nanowires in Electroless Metal Deposition", Adv. Funct. Mater., 13, No. 2 (2003) 127-132.
Peng et al., "Synthesis of Large-Area Silicon Nanowire Arrays via Self-Assembling Nanoelectrochemistry", Adv. Mater., 14, No. 16 (2002) 1164-1167.
Winter, et al., "Insertion Electrode Materials for Rechargeable Lithium Batteries", Advanced Materials, 1998, 10, No. 10.
Kasavajjula et al., "Nano- and Bulk-Silicon-Based Insertion Anodes for Lithium-Ion Secondary Cells", Journal of Power Sources, 163 (2007) 1003-1039.
Peng, et al., "Fabrication of Single-Crystalline Silicon Nanowires by Scratching a Silicon Surface with Catalytic Metal Particles", Adv. Funct. Mater., 16 (2006), 387-394.
Barraclough et al., "Cold Compaction of Silicon Powders Without a Binding Agent", Materials Letters 61 (2007) 485-487.
International Search Report for PCT/GB2008/001604 dated Aug. 27, 2008.
Written Opinion of the International Searching Authority dated Aug. 27, 2008.
Badel et al., "Formation of Ordered Pore Arrays at the Nanoscale by Electrochemical Etching of N-Type Silicon", Superlattices and Microstructures, 36 (2004) 245-253.
Beaulieu et al., "Colossal Reversible Volume Changes in Lithium Alloys", Electrochemical and Solid-State Letters, 4 (9) (2001) A137-A140.
Beaulieu et al., "Reaction of Li with Grain-Boundary Atoms in Nanostructured Compounds", Journal of the Electrochemical Society, 147 (9) (2000) 3206-3212.
Besenhard et al., "Will Advanced Lithium-Alloy Anodes Have a Chance in Lithium-Ion Batteries?", Journal of Power Sources, 68 (1997) 87-90.
Boukamp et al., "All-Solid Lithium Electrodes with Mixed-Conductor Matrix", J. Electrochem. Soc.: Electrochemical Science and Technology, vol. 128, No. 4, (1981) 725-729.
Bourderau, et al., "Amorphous Silicon as a Possible Anode Material for Li-Ion Batteries", Journal of Power Sources, 81-82 (1999) 233-236.
Ivanovskaya et al., "The Effect of Treatment of Cation-Selective Glass Electrodes With $AgNO_3$ Solution on Electrode Properties", Sensors and Actuators B 24-25 (1995) 304-308.
Peng et al., "Fabrication of Large-Area Silicon Nanowire p-n Junction Diode Arrays", Adv. Mater. (2004), vol. 16, No. 1, 73-76.
Peng et al., "Silicon Nanowires for Rechargeable Lithium-ion Battery Anodes", Applied Physics Letters (2008) vol. 93, No. 3, pp. 33105-1 to 33105-3.
De Angelis et al., "Water Soluble Nanoporous Nanoparticles for In Vivo Targeted Drug Deliver and Controlled Release in B Cells Tumor Context", Nanoscale, 1020, vol. 2, p. 2230-2236.
Garrido, et al., The Role of Chemical Species in the Passivation of <100> Silicon Surfaces by HF in Water-Ethanol Solutions, J. Electrochem Soc., vol. 143, No. 12, 1996, p. 4059-4066.
Russo, et al., "A Mechanochemical Approach to Porous Silicon Nanoparticles Fabrication", Materials 2011, vol. 4, p. 1023-1033.
Takami et al., "Silicon Fiber Formed on Silicon Without Using a Gas Process", Journal of Applied Physics, vol. 91, No. 12, 2-5 (2002).
Ye et al., Controllable Growth of Silver Nanostructures by a Simple Replacement Reaction and Their SERS Studies, Solid State Sciences 11 (2009), p. 1088-1093.

\* cited by examiner

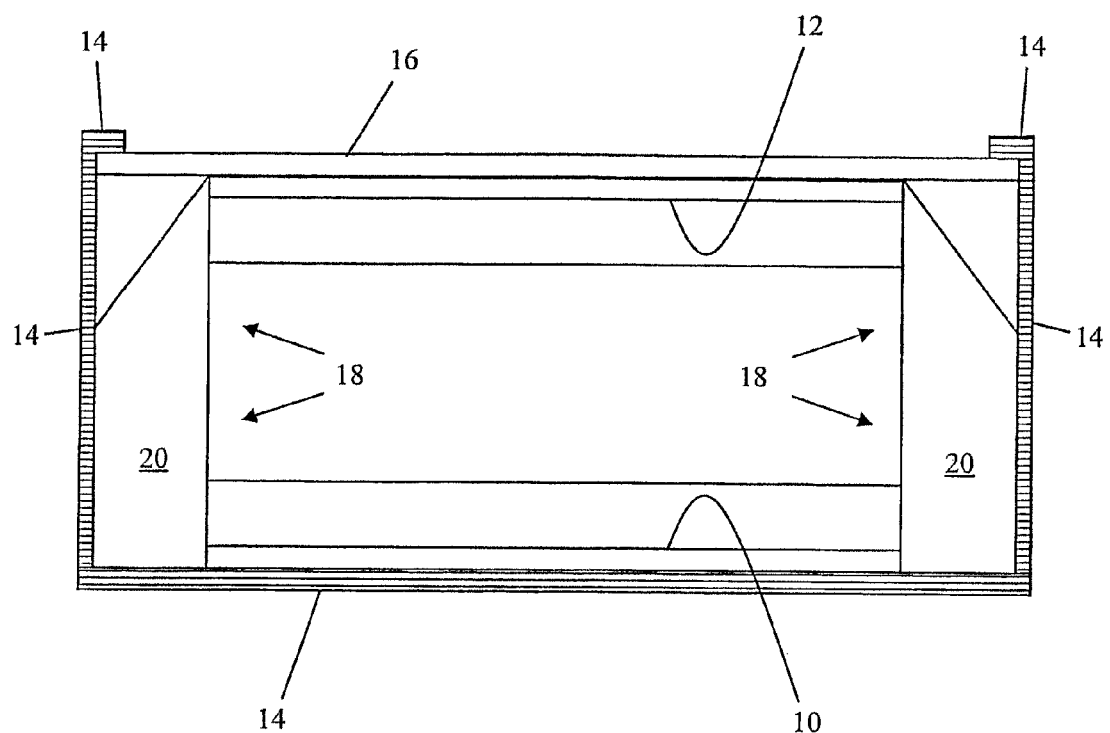

SILICON ANODE FOR A RECHARGEABLE BATTERY

This invention relates to an electrode for a rechargeable battery cell that uses silicon or a silicon-based material as its active ingredient, in particular although not exclusively for use as the anode in a lithium-ion battery cell.

The recent increase in the use of portable electronic devices such as mobile telephones and notebook computers has created a need for smaller, lighter, longer lasting rechargeable batteries to provide the power to the above mentioned and other battery powered devices. During the 1990s, lithium rechargeable batteries, specifically lithium-ion batteries, became popular and, in terms of units sold, now dominate the portable electronics marketplace. However, as more and more power hungry functions are added to the above mentioned devices (e.g. cameras on mobile phones), improved batteries that store more energy per unit mass and per unit volume are required.

It is well known that silicon can be used as the active anode material of a rechargeable lithium-ion electrochemical battery cell (see, for example, Insertion Electrode Materials for Rechargeable Lithium Batteries, M. Winter, J. O. Besenhard, M. E. Spahr, and P. Novuk in Adv. Mater. 1998, 10, No. 10). The basic composition of a conventional lithium-ion rechargeable battery cell is shown in FIG. 1 including a graphite-based anode electrode, the component to be replaced by the silicon-based anode. The battery cell includes a single cell but may also include more than one cell.

The battery cell generally comprises a copper current collector for the anode 10 and an aluminium current collector for the cathode 12 which are externally connectable to a load or to a recharging source as appropriate. A graphite-based composite anode layer 14 overlays the current collector 10 and a lithium containing metal oxide-based composite cathode layer 16 overlays the current collector 12. A porous plastic spacer or separator 20 is provided between the graphite-based composite anode layer 14 and the lithium containing metal oxide-based composite cathode layer 16 and a liquid electrolyte material is dispersed within porous plastic spacer or separator 20, the composite anode layer 14 and the composite cathode layer 16. In some cases, the porous plastic spacer or separator 20 may be replaced by a polymer electrolyte material and in such cases the polymer electrolyte material is present within both the composite anode layer 14 and the composite cathode layer 16.

When the battery cell is fully charged, lithium has been transported from the lithium containing metal oxide via the electrolyte into the graphite-based layer where it reacts with the graphite to create the compound, $LiC_6$. The graphite, being the electrochemically active material in the composite anode layer, has a maximum capacity of 372 mAh/g. It will be noted that the terms "anode" and "cathode" are used in the sense that the battery is placed across a load.

It is generally believed that silicon, when used as an active anode material in a lithium-ion rechargeable cell, provides a significantly higher capacity than the currently used graphite. Silicon, when converted to the compound $Li_{21}Si_5$ by reaction with lithium in an electrochemical cell, has a maximum capacity of 4,200 mAh/g, considerably higher than the maximum capacity for graphite. Thus, if graphite can be replaced by silicon in a lithium rechargeable battery the desired increase in stored energy per unit mass and per unit volume can be achieved.

Existing approaches of using a silicon or silicon-based active anode material in a lithium-ion electrochemical cell have failed to show sustained capacity over the required number of charge/discharge cycles and are thus not commercially viable.

One approach disclosed in the art uses silicon in the form of a powder (say as particles or spherical elements with a 10 µm diameter), in some instances made into a composite with or without an electronic additive and containing an appropriate binder such as polyvinylidene difluoride coated onto a copper current collector. However, this electrode system fails to show sustained capacity when subjected to repeated charge/discharge cycles. It is believed that this capacity loss is due to partial mechanical isolation of the silicon powder mass arising from the volumetric expansion/contraction associated with lithium insertion/extraction to and from the host silicon. In turn this gives rise to electrical isolation of the silicon elements from both the copper current collector and themselves. In addition, the volumetric expansion/contraction causes the spherical elements to be broken up causing a loss of electrical contact within the spherical element itself.

Another approach known in the art designed to deal with the problem of the large volume changes during successive cycles is to make the size of the silicon elements that make up the silicon powder very small, that is to use spherical particles that have diameters in the 1-10 nm range. This strategy assumes that the nano-sized elements can undergo the large volumetric expansion/contraction associated with lithium insertion/extraction without being broken up or destroyed. However, this approach is problematic in that it requires the handling of very fine, nano-sized powder that may pose a health and safety risk and it does not prevent the electrical isolation of the spherical elements from both the copper current collector and themselves as the silicon powder undergoes the volumetric expansion/contraction associated with lithium insertion/extraction. Importantly, since a lithium-containing surface film is typically created during lithium insertion and the lithium ions that make up this surface film are trapped and can not be removed during the deinsertion process, the large surface area of the nano-sized elements can give introduce large irreversible capacity into the lithium-ion battery cell. In addition, the large number of small silicon particles creates a large number of particle-to-particle contacts for a given mass of silicon and these each have a contact resistance and may thus cause the electrical resistance of the silicon mass to be too high. The above problems have thus prevented silicon particles from becoming a commercially viable replacement for graphite in lithium rechargeable batteries and specifically lithium-ion batteries.

In another approach described by Ohara et al. in Journal of Power Sources 136 (2004) 303-306 silicon is evaporated onto a nickel foil current collector as a thin film and this structure is then used to form the anode of a lithium-ion cell. However, although this approach gives good capacity retention, this is only the case for very thin films (say ~50 nm) and thus these electrode structures do not give usable amounts of capacity per unit area. Increasing the film thickness (say >250 nm) causes the good capacity retention to be eliminated. The good capacity retention of these thin films is considered by the present inventors to be due to the ability of the thin film to absorb the volumetric expansion/contraction associated with lithium insertion/extraction from the host silicon without the film being broken up or destroyed. Also, the thin film has a much lower surface area than the equivalent mass of nano-sized particles and thus the amount of irreversible capacity due to the formation of a lithium-containing surface film is reduced. The above problems have thus prevented a thin film of silicon on a metal foil current collector from becoming a commercially viable replacement for graphite in lithium rechargeable batteries and specifically lithium-ion batteries.

In another approach described in U.S. Pat. No. 6,887,511, silicon is evaporated onto a roughened copper substrate to create medium-thickness films of up to 10 μm. During the initial lithium ion insertion process, the silicon film breaks up to form pillars of silicon. These pillars can then reversibly react with lithium ions and good capacity retention is achieved. However, the process does not function well with thicker films and the creation of the medium-thickness film is an expensive process, thus limiting this concept's commercially viability. Also, the pillared structure created by the break up of the film has no inherent porosity and thus the long terms capacity retention is questionable.

In another approach described in US2004/0126659, silicon is evaporated onto nickel fibres which are then used to form the anode of a lithium battery. However this is found to provide an uneven distribution of silicon on the nickel fibres hence significantly affecting operation. In addition, these structures have a high ratio of nickel current collector mass to active silicon mass and thus do not give usable amounts of capacity per unit area or per unit mass.

A review of nano- and bulk-silicon-based insertion anodes for lithium-ion secondary cells has been provided by Kasavajjula et al (J. Power Sources (2006), doi:10.1016/jpowsour.2006.09.84), herewith incorporated by reference herein.

The invention is set out in the independent claims.

Advantageously, some embodiments provide an electrode containing as its active material an interconnected array of high-aspect ratio silicon or silicon-based elements. Cycle life is improved as the structure of the elements, in conjunction with an upper limit of the smallest dimension of the elements, allows for accommodation of the volume expansion associated with insertion/extraction (charging and discharging) of the silicon or silicon-based elements while a lower limit on the smallest dimension controls the ratio of surface area for a given volume of silicon or silicon-based and thus minimises the surface-related irreversible capacity. At least one other dimension is chosen sufficiently large such as to ensure multiple contacts between elements for good electronic conductivity.

The high-aspect ratio elements may be elongate, for example ribbon-like such that a first larger dimension is larger than the smallest dimension and a second larger dimension is larger than the first larger dimension. High-aspect ratio elements may also be sheet-like or flake-like, wherein the first and second larger dimensions are larger than the first dimension but comparable to each other.

The invention is now described, by way of example only and with reference to the accompanying FIG. 1, schematically showing a lithium ion rechargeable cell including an anode electrode in accordance with embodiments of the invention.

It has been realised by the inventors that the above-mentioned problems and drawbacks of the prior art may be addressed by carefully selecting the dimensions and geometry of the silicon or silicon-based elements that are the active ingredient of an electrode for a rechargeable battery. For elongate elements which have two comparable dimensions smaller than a third dimension (referred to as fibres in the remainder), to a first approximation, the irreversible capacity loss is inversely proportional to the diameter of the fibre. Similarly, for an elongate structure for which one of the two smaller dimensions is larger, than the other one, for example twice as large or more as the smaller dimension (referred to below as a ribbon) and for a element which has two comparable largest dimension and a single dimension smaller than that (referred to as a sheet or flake below) the irreversible capacity can be shown to be approximately inversely proportional to the thickness of the ribbon or sheet (that is the smallest dimension), ignoring the sides of the ribbon or the sheet. Thus, for fibres, ribbons, flakes or sheets, a ten-fold decrease in the smallest dimension approximately is expected to result in a ten-fold increase in the irreversible capacity loss. These considerations impose a lower limit on the smallest dimension for these structures if they are to be used as silicon elements in a composite electrode with limited irreversible capacity loss.

As discussed above, one significant problem in the use of silicon or silicon-based materials as the active anode material for a lithium-ion rechargeable battery cell is the large volume changes associated with the charging and discharging of the cell. The associated stresses lead to crack formation in bulk silicon; as described above. Experimental work on pillar-shaped silicon substrates has shown that silicon pillars of close to 1 micrometer diameter (approximately 0.8 micrometer) can be formed which can accommodate the volume changes without cracking [Mino Green, Elizabeth Fielder, Bruno Scrosati, Mario Wachtler and Judith Serra Moreno, "Structured Silicon Anodes for Lithium Battery Applications", Electrochemical and Solid-State Letters: 6, A75-A79 (2003).] Furthermore, experimental work on silicon plates has shown that even in thick plates (350 microns thickness) stress fractures have a characteristic length of 10 microns.

Based on the foregoing considerations, the smallest dimension of silicon or silicon-based elements in a electrode in accordance with an embodiment of the invention may be in the range of 0.08 to 1 preferably 0.2 μm to 0.3 μm or within the range therebetween. To further ensure a favourable surface area to volume ratio, the second largest dimension should be at least two times as large as the smallest dimension.

Another consideration is the number of electrical interconnections between the elements. For elongate elements such as fibres or ribbons, the larger the largest dimension, the more likely the individual members are to criss-cross each other and form multiple connections there between. Similarly, for sheet or flake-like members, the larger the flakes or sheets, the more likely they will be to mutually overlap. Moreover, the larger the one or two largest dimensions, the more mass of silicon will be arranged for a given surface area, further reducing irreversible capacity. Based on these considerations, the largest, or largest two dimensions are chosen to be larger than ten times the smallest dimension, preferable 100 or 200 times larger or within the range therebetween. The total length or largest dimension may be as large as 500 μm, for example.

It will be appreciated, of course, that any appropriate approach can be adopted in order to fabricate the silicon or silicon-based elements discussed above.

For example, fibres can be manufactured by forming pillars on a suitable silicon or silicon-based substrate and detaching these pillars to create fibres by a suitable method. Pillars of silicon can be manufactured as described in PCT/GB2007/000211 or as described in U.S. application Ser. No. 10/049,736.

Ribbons of silicon can be manufactured via a lithography process such that suitably shaped structure are made on a silicon or silicon-based substrate and then detached from the substrate using a suitable detachment method.

Sheets (or also flakes) may be manufactured using thin film deposition of silicon on poorly adhering substrates leading to detachable sheets of silicon. If the detachable sheet is broken up, flakes result.

Once the silicon or silicon-based elements have been manufactured they can be used as the active material in a composite anode for lithium-ion electrochemical cells. To fabricate a composite anode, the elements can be mixed with polyvinylidene difluoride and made into a slurry with a casting solvent such as n-methyl pyrrolidinone. This slurry can then be applied or coated onto a metal foil or other conducting substrate for example physically with a blade or in any other appropriate manner to yield a coated film of the required thickness and the casting solvent is then evaporated from this film using an appropriate drying system which may employ elevated temperatures in the range of 50 degrees C. to 140 degrees C. to leave the composite film free or substantially from casting solvent. The resulting composite film has a porous structure in which the mass of silicon or silicon-based elements is typically between 70 percent and 95 percent. The composite film will have a percentage pore volume of 10-30 percent, preferably about 20 percent.

Fabrication of the lithium-ion battery cell thereafter can be carried out in any appropriate manner for example following the general structure shown in FIG. 1 but with a silicon or silicon based active anode material rather than a graphite active anode material. For example the silicon elements-based composite anode layer is covered by the porous spacer 18, the electrolyte added to the final structure saturating all the available pore volume. The electrolyte addition is done after placing the electrodes in an appropriate casing and may include vacuum filling of the anode to ensure the pore volume is filled with the liquid electrolyte.

A particular advantage of the approach described herein is that large sheets of silicon-based anode can be fabricated and then rolled or stamped out subsequently as is currently the case in graphite-based anodes for lithium-ion battery cells meaning that the approach described herein can be retrofitted with the existing manufacturing capability.

It will be appreciated, of course, that any appropriate approach can be adopted in order to arrive at the approaches and apparatus described above. For example the element manufacture can comprise any of a suitable method employed in the silicon processing industry. The cathode material can be of any appropriate material, typically a lithium-based metal oxide material. The elements can have any appropriate dimension and can for example be pure silicon or doped silicon or other silicon-based material such as a silicon-germanium mixture or any other appropriate mixture.

The above description is by way of example only and not intended to be limiting on the scope of the claimed subject matter which is intended to cover any such modifications, juxtapositions or alterations of the above-described embodiments as may appear to the skilled person. For example, although the specific description has been presented in terms of silicon as an electrode material, other silicon-based materials may be employed in place of undoped silicon, such as doped silicon, for example SiGe.

The present invention resulted from work undertaken under a joint research agreement between Nexeon Ltd and Imperial Innovations Ltd in the field of batteries, rechargeable cells and associated energy storage devices.

The invention claimed is:

1. An electrochemical cell anode comprising
a porous composite film containing a plurality of discrete silicon or silicon-based elements as an active material, each having a first dimension in the range of 0.08 μm to 0.3 μm and a second dimension of at least five times as large as the first dimension, the composite film having a mass of silicon or silicon-based elements between 70 and 95 percent,
wherein the silicon or silicon-based elements form an interconnected array,
wherein the silicon or silicon-based elements are capable of lithium insertion and removal, and
wherein the silicon or silicon-based elements are selected from the group consisting of hollow tubes, ribbons and flakes.

2. An electrochemical cell anode as claimed in claim 1, in which the silicon or silicon-based elements are elongate.

3. An electrochemical cell anode as claimed in claim 1 further comprising a copper current collector.

4. An electrochemical cell containing an electrochemical cell anode as claimed in claim 1.

5. An electrochemical cell as claimed in claim 4 in which a cathode of the electrochemical cell comprises lithium-based compound as its active material.

6. An electrochemical cell as claimed in claim 5 in which the cathode comprises lithium-based metal oxide as its active material.

7. A device powered by an electrochemical cell as claimed in claim 4.

8. An electrochemical cell anode as claimed in claim 1 wherein the elements have a third dimension oriented transverse to each of the first and second dimensions, the third dimension being at least ten times as large as the first dimension.

9. An electrochemical cell anode as claimed in claim 1 wherein the elements have a third dimension oriented transverse to each of the first and second dimensions, the third dimension being at least 100 times as large as the first dimension.

10. An electrochemical cell anode as claimed in claim 1 wherein members of the interconnected array form multiple connections therebetween.

11. An electrochemical cell anode as claimed in claim 1 wherein members of the interconnected array criss-cross one another.

12. An electrochemical cell anode as claimed in claim 1 wherein the first dimension is in the range of 0.2 μm to 0.3 μm.

13. An electrochemical cell anode as claimed in claim 1 wherein the silicon or silicon-based elements are hollow tubes.

14. An electrochemical cell anode as claimed in claim 1 wherein the silicon or silicon-based elements are ribbons.

15. An electrochemical cell anode as claimed in claim 1 wherein the silicon or silicon-based elements are flakes.

16. An electrochemical cell anode as claimed in claim 1 wherein the second dimension is at least 10 times as large as the first dimension.

17. An electrochemical cell anode as claimed in claim 1 wherein the elements further comprise a third dimension that is at least 10 times as large as the first dimension.

18. An electrochemical cell anode as claimed in claim 4 further comprising an electrolyte saturating the available electrode pore volume.

19. A lithium-ion rechargeable battery cell containing an electrochemical cell anode as claimed in claim 1.

20. An electrochemical anode as claimed in claim 1, wherein the composite film has a pore volume between 10% and 30%.

21. An electrochemical cell as claimed in claim 6, wherein the active material of the cathode comprises $LiCoO_2$.

22. An electrochemical anode as claimed in claim 1, wherein the elements have a largest dimension that is no larger than 500 μm.

* * * * *